United States Patent Office 3,065,254
Patented Nov. 20, 1962

3,065,254
CYCLIC SILANE ESTERS
Paul F. Silva, Jonesville, N.Y., assignor to General Electric Company, a corporation of New York
No Drawing. Filed Mar. 17, 1960, Ser. No. 15,552
1 Claim. (Cl. 260—448.8)

The present invention relates to certain novel cyclic glycol esters of difunctional alkenyl silanes and to a process for making them. More particularly, the present invention relates to a method for making novel cyclic esters of difunctional alkenyl silanes that are useful additives in the production of organopolysiloxane adhesive compositions, and to the novel cyclic silane esters produced thereby.

The novel cyclic silane esters of the present invention, hereinafter referred to sometimes as the "cyclic glycol esters of organoalkenylsilanes" have the formula:

(1) 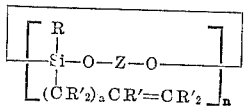

where $a$ is a whole number equal to from 0 to 1, $n$ is an integer equal to from 1 to 10 inclusive, Z is a member selected from the class of alkylene radicals containing from 2 to 8 carbon atoms inclusive and alkyleneoxyalkylene radicals containing from 4 to 9 carbon atoms, inclusive, R is a member selected from the class consisting of monovalent hydrocarbon radicals, halogenated monovalent hydrocarbon radicals, and cyanoalkyl radicals, and R′ is a member selected from a class of hydrogen and lower alkyl radicals.

The novel cyclic glycol esters of organoalkenylsilanes of Formula 1 are prepared by reacting a difunctional alkenylsilane and an alkylene glycol or a polyalkylene glycol. The difunctional alkenylsilanes that are operable in the present invention have the formula:

(2)
$$\text{X}-\underset{\underset{(\text{CR}'_2)_a\text{CR}'=\text{CR}'_2}{|}}{\overset{\text{R}}{\underset{|}{\text{Si}}}}-\text{X}$$

where X is halo, including chloro and bromo, and alkoxy such as ethoxy, and $a$, R and R′ are as defined above. R is more particularly aryl or haloaryl such as phenyl, tolyl, naphthyl, chlorophenyl, etc. radicals; aralkyl such as benzyl, phenethyl, etc. radicals; alkyl or haloalkyl such as methyl, ethyl, propyl, chlorobutyl, etc. radicals; and R is preferably methyl, phenyl, and cyanoethyl radicals, and R′ is the same or different radicals, such as all hydrogen, all alkyl, or a mixture of hydrogen and alkyl radicals and is preferably hydrogen.

To further illustrate the alkenylsilanes represented by Formula 2, specific examples are vinylmethyldichlorosilane, allylmethyldichlorosilane, vinylmethyldiethoxysilane, allylmethyldiethoxysilane, vinylcyanoethyldichlorosilane, vinylphenyldiethoxysilane, propenylphenyldichlorosilane, etc.

The syntheses of some of these alkenylsilanes are described in Rochow, Chemistry of the Silicones, second edition John Wiley and Sons, New York (1951). Procedures illustrating the preparation of cyanoalkylsilanes are described in the copending application of Ben A. Bluestein, Serial No. 852,219, filed November 12, 1959, and assigned to the same assignee as the present invention, now U.S. Patent No. 2,992,083.

The alkylene glycols that are included in the present invention are illustrated as follows:

(3)                 HO—Z—OH where Z is as defined in Formula 1, and is more particularly a member selected from the class of $(CR'_2)_b$ and $(CR'_2)_c-[O-(CR'_2)_c]_d$, where R′ is as defined in Formula 1, $b$ is an integer equal to from 2 to 8 inclusive, $c$ is an integer equal to from 2 to 3 inclusive and $d$ is an integer equal to from 1 to 2 inclusive. Specific examples of the alkylene glycols represented by Formula 3 are ethylene glycol, 1,2-propanediol, diethylene glycol, 2,3-butanediol, 1,1,2,2-tetramethylethanediol, dipropylene glycol, 1,4-butanediol, 1,6-hexanediol, triethylene glycol, 3-8-octanediol, etc.

In preparing the novel cyclic silane esters of the present invention, an alkylene glycol is reacted with a difunctional alkenylsilane. When a higher molecular weight glycol, such as butylene glycol is employed, it has been found expedient to react it with a dialkoxyalkenylsilane instead of a dihaloalkenylsilane in order to minimize the occurrence of undesirable side reactions.

The order of addition of the reactants or the reactant ratios needed to produce the desired cyclic silane ester reaction product is not critical, although it is desirable to maintain the reactants at substantially an equal mole basis in view of economic considerations. When reacting the alkylene glycol with the appropriate alkenylsilane, it is often desirable to agitate the mixture to facilitate formation of the final reaction product and the elimination of undesirable by-products such as HCl.

Although the reaction is spontaneous, it may be initiated, such as by warming the reaction mixture, and employing suitable catalysts including ion exchange resins, alkali alkoxides, alkali metals, etc. Temperatures up to reflux or higher are preferred, while a temperature range from about 0° C. to 150° C. is operable.

It is often desirable to have at least one of the reactants dissolved in a suitable inert organic solvent to facilitate among other things, the recovery of the final reaction product. Any organic solvent which is inert to the reactants under the conditions of the reaction can be employed in the practice of the present invention. Suitable organic solvents that are included are chloroform, dioxane, tetrahydrofuran, etc. After the reaction has been initiated, the mixture can be refluxed over a period of at least one hour to as many as four hours or higher. At the conclusion of the reaction a suitable neutralizing agent including sodium carbonate etc. can be added to the distillation residue to remove residual HCl. The final reaction product then can be recovered by conventional procedures, such as for example, distillation of the reaction residue.

In order that those skilled in the art may be able to better practice the invention the following examples are given by way of illustration and not by way of limitation. All parts are by weight.

*Example 1*

In a flask equipped with a stirrer, thermometer, and condenser, there was charged 282 parts of vinylmethyldichlorosilane, 93 parts of ethylene glycol, and 309 parts of 1-4 dioxane. The mixture was heated to reflux and allowed to reflux four hours. Excess solvent was distilled off to recover the reaction residue that was neutralized with sodium bicarbonate, and the mixture was then filtered. The crude product was fractionated through a Vigreux column at 10 millimeters at 110° C. A 30% recovery of vinylmethylethylenedioxysilane dimer,

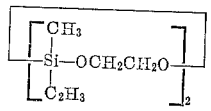

$n_D^{20}$ 1.4404, was obtained and its identity was confirmed by infra-red analysis.

Example 2

In a procedure similar to Example 1 there was charged to a reaction flask 80 parts of vinylmethyldiethoxysilane, 45 parts of 1,4 butylene glycol, and 1 part of a cation exchange resin in the form of sulfonated coal. After stirring, the resulting mixture was heated to reflux, and the ethanol was distilled from the system as it was formed. When about 52 parts of the distillate had been collected, the reflux was stopped at a pot temperature of 115° C. The crude product was filtered and flash distilled at 88–90° C. and 20 millimeters. A 30% yield of vinylmethyl-1,4-tetramethylenedioxy silane

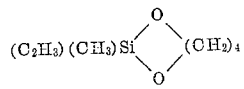

was obtained whose identity was confirmed by infra-red analysis.

Example 3

A convertible organopolysiloxane is prepared by heating 100 parts of octamethylcyclopolysiloxane to a range of 110 to 155° C. while agitating the mass with 0.001 part by weight of potassium hydroxide for about 4 hours, to obtain a highly viscous benzene soluble mass of only slight flow. This material has a ratio of approximately two methyl groups per silicon atom and has a viscosity of about 6 million centistokes.

A mixture containing 100 parts of the above prepared convertible organopolysiloxane, 40 parts fumed silica filler, and 8 parts of the cyclic silane ester of Example 1 is milled in a Banbury mixer for one hour at about 130° C. Two parts of benzoyl peroxide is added to the resulting composition and the curable mixture is added to 200 parts of xylene to form a solution. A similar solution is prepared with the same ingredients except that the cyclic silane ester of Example 1 is omitted.

Aluminum test foils are then dipped into the solution containing the cyclic silane ester of Example 1 which will hereinafter be referred to as the "composition" and the "control" solution that is prepared without the silane ester additive. The coated aluminum foils are then air dried and cut into two pieces. The halved sections are then bonded together in a press for 10 minutes at 150° C. at 100 p.s.i. forming a composite two ply aluminum strip.

A peel test is then performed with the aid of a Scott tester using a pull of 2″ per minute. An adhesive type failure, that is, a clean separation between the aluminum foil and rubber is not desirable as it indicates an aluminum rubber bond strength below the tear strength of the rubber. A cohesive type failure is a positive indication of good bonding between the rubber and the aluminum foil as the rubber tears before a rubber-aluminum separation.

The following illustrates the results of the test.

| Samples: | Type Failure |
|---|---|
| Composition | Cohesive. |
| Control | Adhesive. |

The above results clearly demonstrate the utility of the cyclic silane esters of the present invention as additives for organopolysiloxane to produce metal adhesive compositions.

The foregoing examples have of necessity described only a few of the very many compositions within the scope of the present invention and it should be understood that the present invention is directed to the entire class of cyclic silane esters within the scope of Formula 1 and to the preparation of the materials by reacting the alkenylsilanes of Formula 2 with the alkylene glycols of Formula 3.

What I claim as new and desire to secure by Letters Patent of the United States is:

Vinylmethylethylenedioxysilane dimer having the formula:

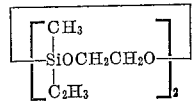

References Cited in the file of this patent

UNITED STATES PATENTS

| 2,386,793 | Hanford | Oct. 16, 1945 |
| 2,441,066 | Hanford | May 4, 1948 |
| 2,746,982 | Hyde | May 22, 1956 |
| 2,876,209 | De Benneville et al. | Mar. 3, 1959 |
| 2,906,768 | Haluska | Sept. 29, 1959 |
| 2,993,871 | Shannon et al. | July 25, 1961 |

FOREIGN PATENTS

| 791,169 | Great Britain | Feb. 26, 1958 |

OTHER REFERENCES

Krieble et al.: Jour. Am. Chem. Soc., vol. 69 (1947), p. 2689–92.